United States Patent [19]

Baker et al.

[11] Patent Number: 5,452,392
[45] Date of Patent: Sep. 19, 1995

[54] FIBER OPTIC, COUPLING APPARATUS HAVING MEANS FOR PREVENTING THERMAL DAMAGE TO THE FIBER OPTIC AT THE FIBER-TO-LIGHT SOURCE COUPLING

[75] Inventors: Glenn S. Baker, Studio City; David D. Chang, Encino, both of Calif.

[73] Assignee: Cogent Light Technologies, Inc., Santa Clarita, Calif.

[21] Appl. No.: 262,147

[22] Filed: Jun. 20, 1994

[51] Int. Cl.[6] .................................................. G02B 6/36
[52] U.S. Cl. .......................................... 385/92; 385/84
[58] Field of Search ...................................... 385/88–94, 385/84, 66, 139

[56] References Cited

U.S. PATENT DOCUMENTS

| | | | |
|---|---|---|---|
| 4,639,077 | 1/1987 | Dobler | 385/92 |
| 5,179,610 | 1/1993 | Milburn et al. | 385/92 |
| 5,274,723 | 12/1993 | Komatsu | 385/92 |

Primary Examiner—Rodney B. Bovernick
Assistant Examiner—John Ngo
Attorney, Agent, or Firm—Blakely, Sokoloff, Taylor & Zafman

[57] ABSTRACT

The present invention provides a fiber optic coupling apparatus for coupling light from a high power light source into a fiber optic while preventing thermal damage to the fiber optic at the fiber-to-light source coupling. The light source comprises a housing having a fiber input structure with inner surfaces defining a through-hole for receiving the fiber optic. The fiber input structure has outer surfaces which define a substantially conical profile of the structure that extends within the housing such that an axis of symmetry of the fiber input structure is substantially coincident with the light input to the fiber optic. The fiber input structure is further made from a high heat conductivity material and has a reflective coating on an input end face for reflecting light that is outside the acceptance angle of the fiber optic, but incident upon the fiber input structure. An elongated, fiber support tube made from a high heat conductivity material is disposed around the fiber optic and extends freely within an internal cavity of the fiber input structure to isolate the fiber optic from the inner surfaces of the fiber input structure and to direct thermal energy away from the fiber-to-light source coupling.

27 Claims, 2 Drawing Sheets

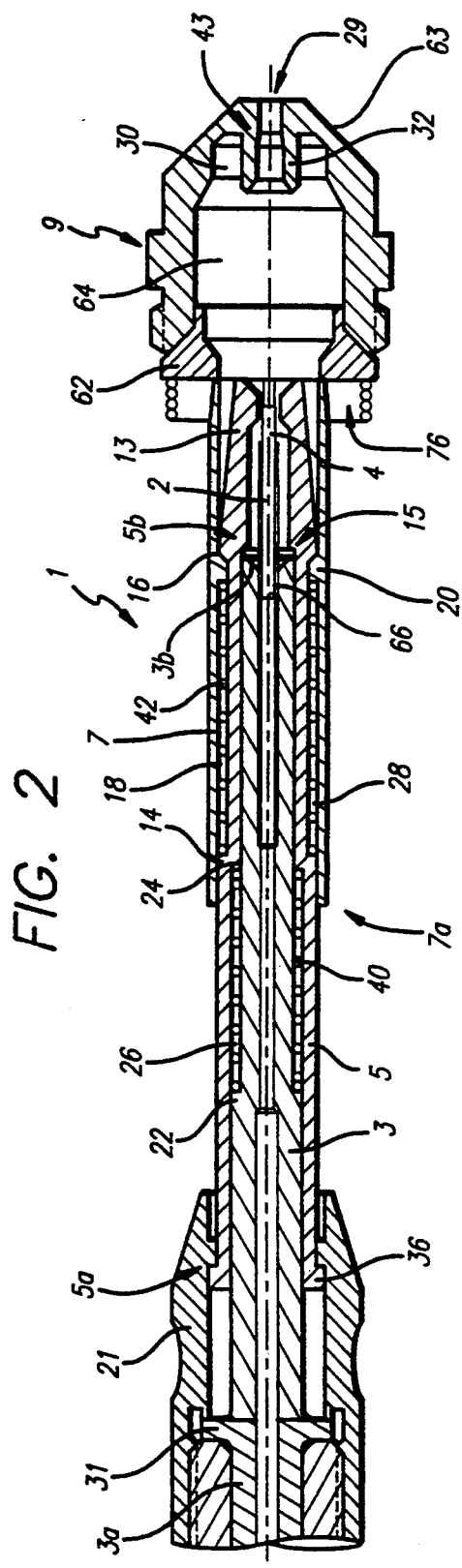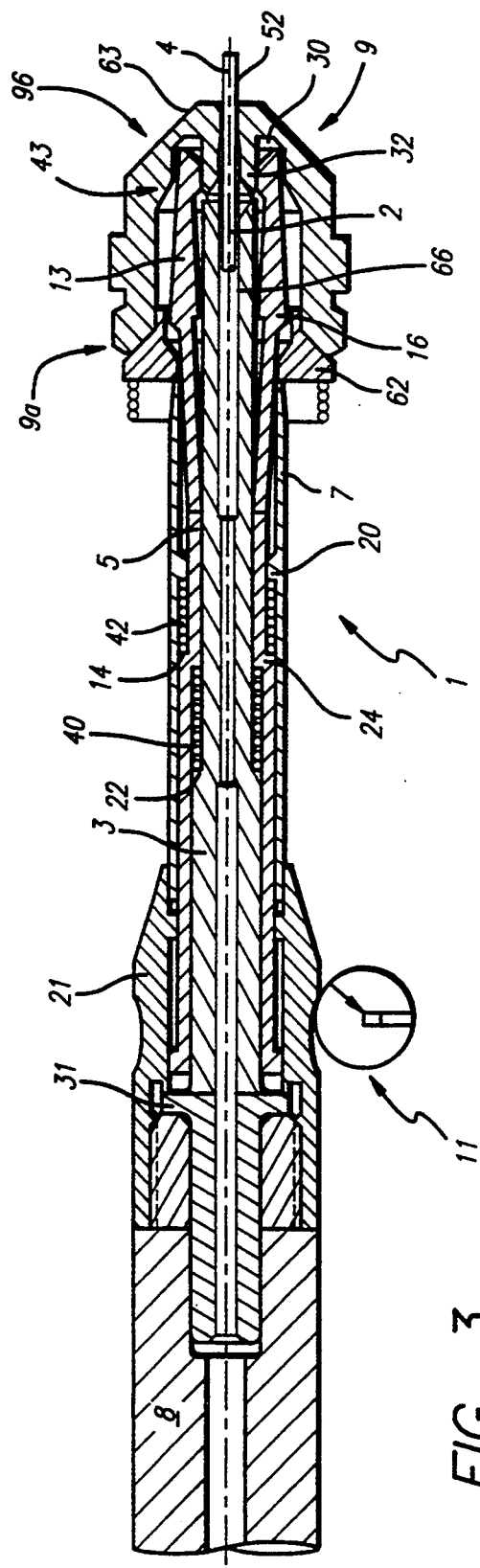

FIBER OPTIC, COUPLING APPARATUS HAVING MEANS FOR PREVENTING THERMAL DAMAGE TO THE FIBER OPTIC AT THE FIBER-TO-LIGHT SOURCE COUPLING

BACKGROUND OF THE INVENTION

1. Field of the Invention

The present invention relates to the field of optical transmission systems, and more specifically, to fiber coupling systems used to couple light between a light source and a fiber optic.

2. Prior Art

In the field of fiber optics, the coupling of light into a fiber optic using a high power, light source can result in thermal damage to the cladding of the fiber optic. The light beam input to the fiber optic defines an acceptance angle with respect to the axis of the fiber optic such that light incident upon the fiber optic at an angle exceeding the acceptance angle will not be transmitted through the fiber optic, but will radiate the housing surfaces surrounding its input end. If the energy density at the focal point of collected light is great and a sufficient amount of light is incident at an unacceptable angle, then the proximate surfaces of the housing will become hot enough to melt the cladding of the fiber optic at the contact points between the fiber optic and the housing.

In order to reduce thermal heating of the fiber optic, some coupling systems have been designed so as to protrude the input end of the fiber optic from the end of the connector that is inserted into the light source housing. In this manner, the fiber optic input end, and hence, the focal point of light at the collection face of the fiber optic, is distanced from the surfaces of the housing most likely to be irradiated. Even so, such an arrangement is not sufficient to prevent thermal damage from resulting with the use of high power, light source coupling systems in which the focal point of collected light has an energy density in the order of 30 Watts per square millimeter (using a 500 watt light source). In addition, this arrangement further requires the use of a fiber optic connector in which the input end of the fiber optic extends from the end of the connector, thereby exposing the fiber optic input end to physical damage resulting from accidental dropping or improper handling of the connector.

Other, conventional couplings have been designed to reduce thermal heating by means of surrounding the fiber optic at its input end with an insulator that thermally isolates the fiber optic and its cladding from the contact surfaces of the light source housing. Typically, this is accomplished by means of securing an insulating body (i.e., a tubular member made from ceramic or the like) around the fiber optic with an insulating adhesive such as a polymer, rubber, epoxy resin or the like. Although this is effective in inhibiting the transmission of thermal energy from the housing to the cladding of the fiber optic, a significant disadvantage exists in that the insulating adhesives utilized tend to expand and melt when exposed to high temperatures, thus causing the insulating body to crack under stress and further causing misalignment of the fiber(s) within the insulating body and the connector.

SUMMARY OF THE INVENTION

Accordingly, it would be desirable to provide a means for dissipating the thermal energy build-up between the irradiated surfaces of a light source housing and the cladding of a fiber optic without the use of insulators which tend to crack and/or insulating adhesives which tend to expand and melt under high temperatures.

It is therefore an object of the present invention to provide an apparatus for coupling a fiber optic to a high power, light source which dissipates the thermal energy build-up through the implementation of thermally conductive components designed to direct the thermal energy away from the fiber optic cladding.

It is another object of the present invention to provide an apparatus for coupling a fiber optic to a high power, light source via a receiving block and bushing combination, with the apparatus comprising a metallic fiber support tube that surrounds the fiber optic and dissipates the thermal energy generated within the bushing.

It is a further object of the present invention to provide an apparatus for coupling a fiber optic to a high power, light source via a receiving block and bushing combination in which the bushing comprises an exterior surface having a conical shape to provide an inclined, light input face for reflecting light rays outside the acceptance angle of the fiber optic input end.

To accomplish these and other objectives, the present invention provides a fiber optic, coupling apparatus having means for preventing thermal damage to the fiber optic at the fiber-to-light source coupling. In the preferred embodiment, a fiber optic connector preferably having a shielding apparatus is provided for insertion into a light source housing to couple light from the source into the fiber optic. A receiving block made from a high heat conductivity metal is attached to or formed in one of the housing walls for securing the connector to the housing. The receiving block comprises first and second ends and a through-hole passing between the ends for receiving the connector, and further comprises a bushing for guiding the shielding apparatus of the connector into position.

The bushing is made from a high heat conductivity metal, such as aluminum or a copper alloy, and has first and second ends and an through-hole formed coaxially with a through-hole of the receiving block to permit passage of the unsheathed fiber optic end into the internal cavity of the housing. The second, input end of the bushing, which is the end that faces the concentrated light beam transmitted from the optical coupling system of the light source, comprises an exterior surface forming a conical shape for reflecting the light incident upon the fiber optic at an angle exceeding its acceptance angle in addition to the light on the periphery of a light beam having a diameter larger than that of the fiber optic. In order to maximize the reflectivity of the conical, exterior surface, this surface is preferably coated with a nickel or gold plating, or an enhanced aluminum coating.

The bushing acts to guide the shielding apparatus of the connector into position within the bushing such that the fiber optic end is automatically unsheathed and accurately inserted into the internal cavity of the housing. The shielding apparatus comprises an elongated barrel in which the fiber optic is inserted, a tubular collet for receiving the barrel and a protective sleeve for receiving the collet. The elements of the shielding apparatus can be manipulated to either sheath the fiber optic end within the apparatus or to unsheathe the end for insertion into the receiving block of the light source.

When the connector is inserted within the receiving block, the fiber optic end is exposed and subsequently protruded into the internal cavity of the light source housing by means of the sleeve contacting and being pushed back by a stop washer. To align the fiber optic within the through-hole of the bushing, the prongs of the collet are guided into an annular groove formed in the sidewall of the bushing concentric with the through-hole. Once in place, the metallic, fiber support tube extends along the through-hole of the bushing and makes contact with the inner surfaces of the bushing proximate to its sidewall. In this manner, thermal energy generated at the exterior surface of the bushing will be transmitted through the body of the bushing to the fiber support tube so as to dissipate the thermal energy at the critical surface contacts and redirect it throughout the entire length of the support tube. Furthermore, the bushing is also adapted with ventilation holes penetrating through the sidewall and into the circular groove to assist in dissipating the thermal energy build-up within the bushing.

BRIEF DESCRIPTION OF THE DRAWINGS

FIG. 2 is a detailed, schematic diagram showing the input end of the fiber optic connector of the present invention before insertion within the bushing of the receiving block.

FIG. 3 is a detailed, schematic diagram showing the input end of the fiber optic connector of the present invention when inserted within the bushing of the receiving block.

DETAILED DESCRIPTION OF THE INVENTION

Figure 1:
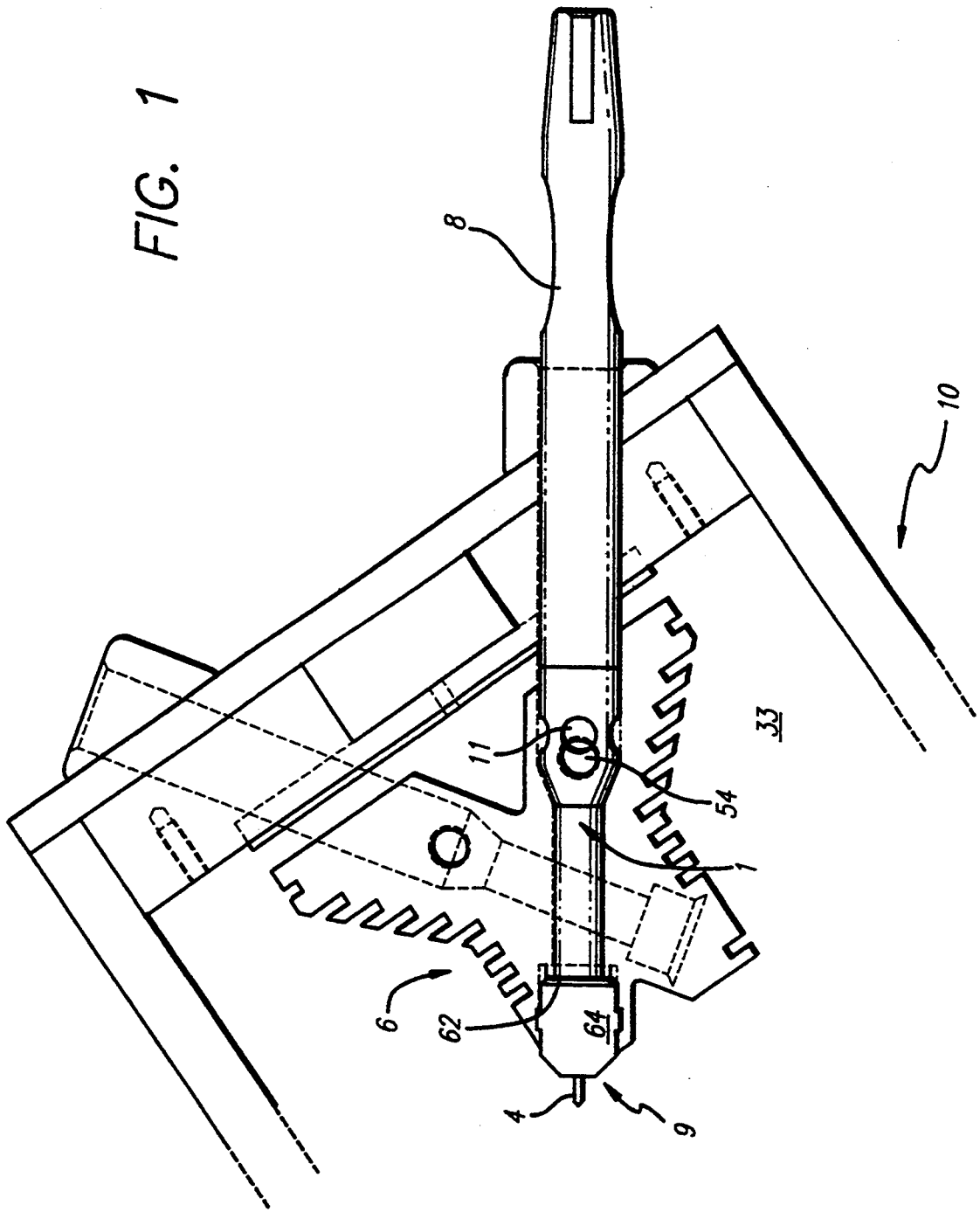
FIG. 1 is a schematic diagram of a light source housing having a wall adapted with a heat sinking, receiving block and bushing in which an input end of a fiber optic connector of the present invention is inserted.

The present invention provides a fiber optic, coupling apparatus having means for preventing thermal damage to the fiber optic at the fiber-to-light source coupling. In the following description, for purposes of explanation and not limitation, specific details are set forth, such as particular dimensions, numbers, optical devices, etc. in order to provide a thorough understanding of the present invention. However, it will be apparent to one skilled in the art that the present invention may be practiced in other embodiments that depart from these specific details. In other instances, detailed descriptions of well-known devices, characteristics and techniques are omitted so as not to obscure the description of the present invention with unnecessary details.

In accordance with the present invention, a fiber optic connector 8 having a body made from a heat resistant material, such as high temperature plastic, aluminum or other metal, is provided for supporting the input end 4 of a fiber optic 2. The connector 8 comprises an elongated body having first and second ends with the second end being adapted with a shielding apparatus 1 for protecting the input end 4 of the fiber optic 2 when not in use.

As shown in FIG. 1, the connector 8 is adapted for insertion into a high power, light source comprising a housing 10 with walls defining an interior cavity 33 in which a lamp (not shown) is disposed. In the preferred embodiment, the light source comprises an improved condensing and collecting optical system employing an off-axis concave reflector to increase the flux density of light input to the fiber optic. As described in more detail in U.S. Pat. No. 4,757,431 issued to Cross et. al, this document being incorporated herein by reference, the off-axis optical system has a lamp transversely displaced from the optical axis of the reflector and the input end of a fiber optic placed at an approximately symmetrical position with respect to the optical axis. The lamp itself preferably comprises a compact xenon arc lamp with a one (1) mm arc length contained in an aspherical glass enclosure.

With respect to the fiber optic 2 used to couple light in the present invention, the fiber optic 2 preferably comprises a quartz core having a diameter ranging between 0.1 mm and 1.0 mm, a cladding consisting of an amorphous fluorocarbon comprising a 1,3-DIOXOLE,4,5-DIFLUORO,2,2-BIS(TRIFLUOROMETHYL)-POLYMER with TETRAFLUOROETHENE, and a silicone buffer. However, optical fibers or fiber bundles made from other conventional materials and having a diameter ranging from 0.1 and 10.0 mm may also be used without departing from the spirit of the present invention.

A receiving block 6 made from a high heat conductivity metal (i.e. aluminum) is attached to or formed in one of the housing walls for securing the fiber optic connector 8 to the housing 10. The receiving block 6 comprises first and second ends 6a, 6b and a through-hole passing between the ends for receiving the connector 8, and further comprises a locking mechanism 11 for securing the connector 8 within the block 6. In the preferred embodiment, the locking mechanism 11 is disposed within the through-hole of the block 6 and comprises a ball bearing spring-loaded into an arcuate seat of the block 6 for engagement with a corresponding arcuate recess in the body of the connector 8 upon insertion into the block 6.

Referring again to FIG. 1, the housing 10 further comprises a bushing 9 made from a high heat conductivity metal, such as aluminum or a copper alloy, secured to the second end 6b of the block 6. The bushing 9 has first and second ends 9a, 9b and an through-hole 29 formed coaxially with the through-hole of the block 6 to permit passage of the unsheathed fiber optic end 4 into the internal cavity 33 of the housing 10. The bushing 9 is secured to the block 6 by means of screwing the bushing 9 down onto a stop washer 62 which is spring-loaded into a recess of the block 6. The second end 9b of the bushing 9, which is the end that faces the concentrated light beam transmitted from the off-axis coupling system, comprises an exterior surface 63 shaped substantially in the form of a cone to provide an inclined, input face for reflecting the light which is incident upon the fiber optic at an angle exceeding its acceptance angle. In order to maximize the reflectivity of the conical, exterior surface 63, this surface 63 is preferably coated with a nickel or gold plating.

The interior of the bushing comprises a cavity 64 for receiving the shielding apparatus 1 of the connector 8. The bushing 9 acts to guide the shielding apparatus 1 of the connector 8 into position within the bushing 9 such that the fiber optic end 4 is automatically unsheathed and accurately inserted into the through-hole 29 and into the internal cavity 33 of the housing 10. Although in the preferred embodiment, the light source housing 10, receiving block 6 and bushing 9 form separate pieces for ease in manufacture and maintenance, the present invention will work just as well with housings in which these elements are integrally formed.

With respect to the shielding apparatus 1, the apparatus 1 comprises an elongated barrel 3, a collet 5 and a protective sleeve 7. The barrel 3 comprises first and second ends 3a, 3b and a through-hole passing between the ends for reception of the fiber optic 2. The collet 5 comprises a tubular body with first and second ends 5a, 5b, prongs 13 disposed at its second end 5a and a through-hole passing between the ends for movable reception of the elongated barrel 3. Similarly, the protective sleeve 7 comprises first and second ends 7a, 7b, and a through-hole passing between the ends for movable reception of the collet 5.

According to one embodiment, the elongated barrel 3 may itself form the entire fiber optic connector 8 by means of its first end 3a being extended in diameter and length suitable for securing the fiber optic 2 and for insertion into the receiving block 6. In the preferred embodiment shown in FIGS. 2 & 3, however, the barrel 3 is secured within the connector 8 by means of an outer flange 31 disposed proximate to its first end 3a for insertion into a detachable collar 21 of the connector 8. At its second end 3b, a metal support tube 66, also made from a high heat conductivity metal, is friction-fitted within the through-hole of the barrel 3 for contacting and supporting the fiber optic input end 4 once inserted within the barrel 3.

Additionally, to secure the fiber optic 2 within the connector 8, and hence within the barrel 3, a metal reception tube (not shown) is crimped around the fiber optic 2 and then press-fitted within the rear end of the connector 8 such that the fiber optic input end 4 extends beyond the metal support tube 66 by a predetermined length. In this manner, the use of adhesives to secure the respective components together need not be used so as to avoid the problems of melting and/or the expansion of the adhesive materials which tend to cause the components to crack or become loose and/or misaligned.

Upon securing the fiber optic 2 within the barrel 3, inserting the barrel 3 within the collet 5 and inserting the collet 5 within the sleeve 7, the shielding apparatus 1 can be manipulated to place it in one of two modes:

1) a first protected mode (FIG. 2) in which the fiber optic end 4 is retracted within the through-hole of the collet 5 by moving the collet 5 towards the second end 3b of the barrel 3 and moving the sleeve 7 towards the second end 5b of the collet 5 to cover and lock the prongs 13 of the collet 5 in position such that the fiber end 4 is protected, and 2) a second unprotected mode (FIG. 3) in which the fiber optic end 4 protrudes from the collet 5 by moving the sleeve 7 towards the first end 5a of the collet 5 to uncover the prongs 13 and moving the collet 5 towards the first end 3a of the barrel 3 to expose the fiber optic end 4.

In accordance with the preferred embodiment of the present invention, the shielding apparatus I is further designed to automatically remain in the protected mode until the connector 8 is inserted within the receiving block 6 of the housing 10. This is accomplished through the use of springs 40, 42 implemented between the barrel 3 and the collet 5 and between the collet 5 and the sleeve 7 as shown in FIGS. 2 & 3. The springs act collectively to keep the barrel 3 retracted within the collet 5 and keep the sleeve 7 disposed over the prongs 13 of the collet 5 so that an object impacting upon the second end 5b of collet 5 will not make contact with the fiber optic end 4 which is protected by the prongs 13 sheathed within the sleeve 7.

When the connector 8 is inserted within the receiving block 6, the fiber optic end 4 is exposed and subsequently protruded into the internal cavity 33 of the light source housing 10 by means of the sleeve 7 contacting and being pushed back by the stop washer 62. To align the fiber optic 2 within the through-hole 29 of the bushing 9, the prongs 13 of the collet 5 are guided into an annular groove 30 formed in the sidewall 43 of the bushing 9 concentric with the through-hole 29.

Once in place, the metallic, fiber support tube 66 extends along the through-hole 29 of the bushing 9 (but not into the internal cavity 33 of the housing 10) and makes contact with the inner surfaces of the bushing 9 proximate to its sidewall 43 (i.e. within the conical portion of the bushing 9). Thermal energy generated at the exterior surface 63 of the bushing 9 will be transmitted through the conductive material of the bushing 9 in two directions; one towards the larger heat sink of the receiving block 6 and the other towards the fiber support tube 66. The thermal energy flowing towards the fiber optic input end 4 is intercepted and absorbed by the thermally conductive material of the support tube 66, and thus, redirected along the length of the tube 66 and away from the critical heating area between the fiber optic 2 and the second end 9b of the bushing 9 where the fiber optic cladding is most vulnerable to melting.

Finally, the bushing 9 is also adapted with ventilation holes penetrating through the sidewall 43 and into the circular groove 30 to assist in dissipating the thermal energy build-up within the passage 64 of the bushing 9.

It will be recognized that the above described invention may be embodied in other specific arrangements and may be used with a plurality of fiber optic connectors (whether they have shielding apparatus' or not) and light sources without departing from the spirit or essential elements of this disclosure. Thus, it is understood that the invention is not to be limited by the foregoing illustrative details, but rather is to be defined by the appended claims.

We claim:

1. An optical system comprising:
   a housing;
   a high power illumination system mounted within the housing;
   a fiber optic coupling apparatus for coupling light from the high power illumination system into the input end of a fiber optic while preventing thermal damage to the fiber optic at the fiber-to-system coupling, said apparatus having a fiber input structure with inner surfaces defining a through-hole for receiving the fiber optic;
   the fiber input structure being made from a high heat conductivity metal and having an exterior wall with reflectively coated, inclined surfaces extending within the housing for reflecting stray light incident upon the fiber input structure; and
   a thermally conductive medium disposed between the inner surfaces of the fiber input structure and the fiber optic to direct thermal energy generated by the light incident on the inclined surfaces of the fiber input structure along a length of the conductive medium leading away from the exterior wall of the fiber input structure.

2. A fiber optic coupling apparatus for coupling light from a high power illumination system into a fiber optic while preventing thermal damage to the fiber optic at the fiber-to-system coupling, with the illumination system having a light source and a housing, the apparatus comprising:

a fiber input structure with inner surfaces defining a through-hole for receiving the fiber optic;

width the fiber input structure having an input end for enclosing an input end of the fiber optic with outer surfaces of the input structure defining a substantially conical profile of the structure extending within the housing such that an axis of symmetry of the fiber input structure is substantially coincident with the light input to the fiber optic, the fiber input structure made from a high heat conductivity material and having a reflective coating applied to the outer surfaces for reflecting stray light incident upon the fiber input structure; and a fiber support tube at least partially disposed within the through-hole of the fiber input structure for receiving a fiber optic inserted within the support tube for isolating the fiber optic from the inner surfaces of the fiber input structure, the support tube being made from a high heat conductivity material for directing thermal energy generated at the outer surfaces of the fiber input structure along the length of the tube and away from the input end of the structure.

3. The apparatus according to claim 2, wherein the fiber input structure comprises a receiving block and a bushing both made from a high heat conductivity metal comprising one of aluminum and a copper alloy, the receiving block having a first end secured to a wall of the system housing, a second end adapted to receive the bushing and a through-hole passing between the ends of the receiving block for passage of the fiber optic into the bushing, the bushing having an input end face forming the conic profile of the fiber input structure with an aperture formed therein for passage of the fiber optic input end into the system housing.

4. The apparatus according to claim 3, wherein the bushing further comprises walls defining an internal cavity and the fiber support tube is inserted within both the internal cavity and the aperture of the input end face of the bushing such that the fiber support tube sheaths the fiber optic to provide a conductive medium within the internal cavity of the bushing to direct thermal energy away from the input end face of the bushing.

5. The apparatus according to claim 4, wherein several apertures are formed through the input end face of the bushing to vent the internal cavity of the bushing.

6. The apparatus according to claim 5, wherein the receiving block comprises an exterior surface forming a plurality of ribs for dissipating thermal energy build-up within the receiving block.

7. The apparatus according to claim 3, wherein the input end face of the bushing is coated with a reflective coating selected from the group consisting of nickel plating, gold plating and an enhanced aluminum coating.

8. In a combination comprising a fiber optic coupler and a high power illumination system, an apparatus is provided for coupling light generated by the illumination system into a fiber optic while preventing thermal damage to the fiber optic at the fiber-to-system coupling, the apparatus comprising:

the illumination system comprising a housing for containing a light source, the housing having a fiber input structure with inner surfaces defining a through-hole for receiving the fiber optic, the fiber input structure having an input end with outer surfaces defining a substantially conic profile of the structure extending within the housing such that an axis of symmetry of the fiber input structure is substantially coincident with the light input to the fiber optic; and a fiber optic connector comprising a housing having a through-hole for receiving the fiber optic and an input end adapted with an elongated fiber support tube for receiving and guiding the fiber optic into the fiber input structure of the illumination system, the fiber optic being inserted within the support tube for isolating the fiber optic from the inner surfaces of the fiber input structure, the support tube being made from a high heat conductivity material for directing thermal energy generated at the outer surfaces of the fiber input structure along the length of the tube and away from the input end of the structure.

9. The apparatus according to claim 8, wherein the fiber input structure is made from a high heat conductivity material and the outer surfaces of the structure are coated with a reflective coating selected from the group consisting of nickel plating, gold plating and an enhanced aluminum coating.

10. The apparatus according to claim 8, wherein the fiber input structure comprises a receiving block and a bushing both made from a high heat conductivity metal comprising one of aluminum and a copper alloy, the receiving block having a first end secured to a wall of the system housing, a second end adapted to receive the bushing and a through-hole passing between the ends of the receiving block for passage of the fiber optic into the bushing, the bushing having an input end face forming the conic profile of the fiber input structure with an aperture formed therein for passage of the fiber optic input end into the system housing.

11. The apparatus according to claim 10, wherein the bushing further comprises walls defining an internal cavity and the fiber support tube is inserted within both the internal cavity and the aperture of the input end face of the bushing such that the fiber support tube sheaths the fiber optic to provide a conductive medium within the internal cavity of the bushing to direct thermal energy away from the input end face of the bushing.

12. The apparatus according to claim 11, wherein several apertures are formed through the input end face of the bushing to vent the internal cavity of the bushing.

13. The apparatus according to claim 12, wherein the receiving block has an exterior surface forming a plurality of ribs for dissipating thermal energy build-up within the receiving block.

14. A fiber optic coupling apparatus for coupling light from a high power illumination system into a fiber optic while preventing thermal damage to the fiber optic at the fiber-to-system coupling, the illumination system comprising a housing having a receiving block secured to an inner wall of the housing, the receiving block having a through-hole for passage of the fiber optic, the apparatus comprising:

a bushing secured within the through-hole of the receiving block having a body with a passage for receiving the fiber optic and a substantially conic, input end face with an aperture for passage of the fiber optic input end, the input end face extending within the system housing such that an axis of symmetry of the input end face is substantially coincident with the light input to the fiber optic, the bushing comprising a thermally conductive metal for dissipating the light incident on the input end face;

a fiber optic connector comprising a housing having a through-hole for receiving the fiber optic and an input end adapted with an elongated fiber support tube for receiving and guiding the fiber optic input end through the aperture of the bushing, the fiber support tube being interposed between the fiber optic and the bushing when the fiber optic input end is inserted within the system housing, the fiber support tube extending freely within the passage of the bushing and being made from a thermally conductive metal to direct thermal energy away from the input end face of the bushing.

15. The apparatus according to claim 14, wherein both the receiving block and the bushing are made from a high heat conductivity metal comprising one of aluminum and a copper alloy.

16. The apparatus according to claim 15, wherein the conic, input end face of the bushing is coated with a reflective coating selected from the group consisting of nickel plating, gold plating and an enhanced aluminum coating for reflecting light incident upon the input end face.

17. The apparatus according to claim 14, wherein several apertures are formed through the input end face of the bushing to vent the internal cavity of the bushing.

18. The apparatus according to claim 14, wherein the receiving block has an exterior surface forming a plurality of ribs for dissipating thermal energy build-up within the receiving block.

19. An optical system comprising:
a housing;
a high power illumination system mounted within the housing;
a fiber optic coupling apparatus for coupling light from the high power illumination system into a fiber optic while preventing thermal damage to the fiber optic at the fiber-to-system coupling, said apparatus having a fiber input structure with inner surfaces defining a through-hole for receiving the fiber optic;
the fiber input structure having an input end with outer surfaces defining a substantially conic profile of the structure extending within the housing such that an axis of symmetry of the fiber input structure is substantially coincident with the light input to the fiber optic, the fiber input structure made from a high heat conductivity material and having a reflective coating applied to the outer surfaces for reflecting stray light incident upon the fiber input structure; and
a fiber support tube at least partially disposed within the through-hole of the fiber input structure for receiving a fiber optic inserted within the support tube for isolating the fiber optic from the inner surfaces of the fiber input structure, the support tube being made from a high heat conductivity material for directing thermal energy generated at the outer surfaces of the fiber input structure along the length of the tube and away from the input end of the structure.

20. The optical system according to claim 19, wherein the fiber input structure comprises a receiving block and a bushing both made from a high heat conductivity metal comprising one of aluminum and a copper alloy, the receiving block having a first end secured to a wall of the system housing, a second end adapted to receive the bushing and a through-hole passing between the ends of the receiving block for passage of the fiber optic into the bushing, the bushing having an input end face forming the conic profile of the fiber input structure with an aperture formed therein for passage of the fiber optic input end into the system housing.

21. The optical system according to claim 20, wherein the bushing further comprises walls defining an internal cavity and the fiber support tube is inserted within both the internal cavity and the aperture of the input end face of the bushing such that the fiber support tube sheaths the fiber optic to provide a conductive medium within the internal cavity of the bushing to direct thermal energy away from the input end face of the bushing.

22. The optical system according to claim 21, wherein several apertures are formed through the input end face of the bushing to vent the internal cavity of the bushing.

23. The optical system according to claim 19, wherein the receiving block has an exterior surface forming a plurality of ribs for dissipating thermal energy build-up within the receiving block.

24. The optical system according to claim 21, wherein the input end face of the bushing is coated with a reflective coating selected from the group consisting of nickel plating, gold plating and an enhanced aluminum coating.

25. A fiber optic coupling apparatus for coupling light from a high power illumination system into the input end of a fiber optic while preventing thermal damage to the fiber optic at the fiber-to-system coupling, with the illumination system having a light source and a housing, the apparatus comprising:
a fiber output structure with inner surfaces defining a through-hole for receiving the fiber optic;
with the fiber input structure being made from a high heat conductivity metal and having an exterior wall with reflectively coated, inclined surfaces, mounted near the input end of the fiber optic, and extending within the housing for reflecting stray light incident upon the fiber input structure; and
a thermally conductive medium disposed between the inner surfaces of the fiber input structure and the fiber optic to direct thermal energy generated by the light incident on the inclined surfaces of the fiber input structure along a length of the conductive medium leading away from the exterior wall of the fiber input structure.

26. The fiber optic coupling apparatus of claim 25 further comprising a locking mechanism for slidably receiving and securing a fiber optic connector mounted to the fiber optic.

27. The fiber optic coupling apparatus of claim 26, wherein the locking mechanism includes a ball bearing spring-loaded into an arcuate seat for engagement with a corresponding arcuate recess within the connector.

* * * * *

UNITED STATES PATENT AND TRADEMARK OFFICE
CERTIFICATE OF CORRECTION

PATENT NO.   : 5,452,392
DATED        : September 19, 1995
INVENTOR(S)  : Baker et al.

It is certified that error appears in the above-identified patent and that said Letters Patent is hereby corrected as shown below:

In column 5 at line 56 change "shielding apparatus I" to --shielding apparatus 1--;

In claim 2 in column 7 at line 5 change "width the fiber" to --with the fiber--

In claim 25 in column 10 at line 41 change "a fiber output structure" to --a fiber input structure--.

Signed and Sealed this

Twenty-third Day of April, 1996

Attest:

BRUCE LEHMAN

Attesting Officer

Commissioner of Patents and Trademarks